(No Model.)
S. EMICK.
CORN OR POTATO MARKER AND COVERER.
No. 511,329. Patented Dec. 26, 1893.
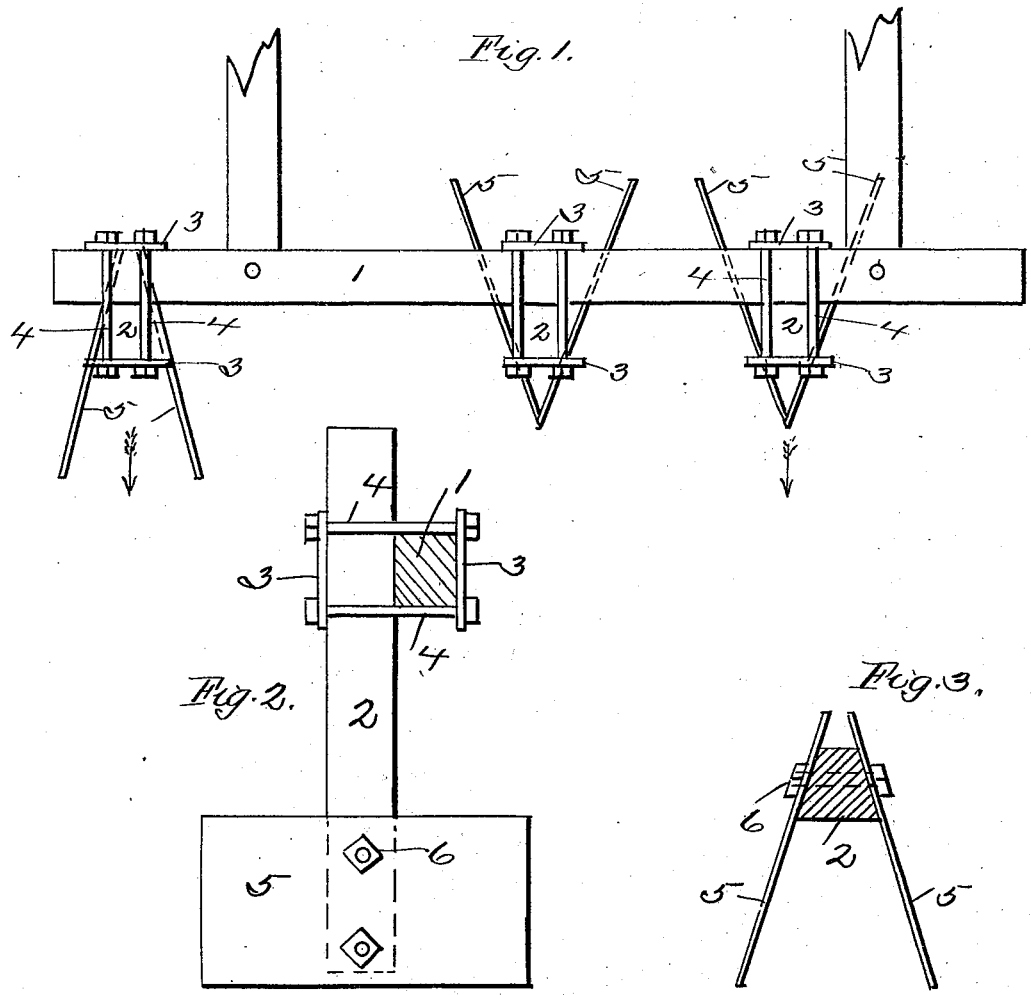

UNITED STATES PATENT OFFICE.

STEPHAN EMICK, OF NOBLESTOWN, PENNSYLVANIA.

CORN OR POTATO MARKER AND COVERER.

SPECIFICATION forming part of Letters Patent No. 511,329, dated December 26, 1893.

Application filed March 31, 1893. Serial No. 468,525. (No model.)

*To all whom it may concern:*

Be it known that I, STEPHAN EMICK, a citizen of the United States, residing at Noblestown, in the county of Allegheny and State of Pennsylvania, have invented certain new and useful Improvements in Corn or Potato Markers and Coverers; and I do hereby declare the following to be a full, clear, and exact description of the invention, such as will enable others skilled in the art to which it pertains to make and use the same, reference being had to the accompanying drawings, which form a part of this specification.

My invention relates to an improved apparatus for marking, covering, and cultivating corn, potatoes, &c., and consists in certain details of construction, and combination of parts as will be fully described hereinafter.

In the accompanying drawings, Figure 1 is a plan view of my improved apparatus for cultivating, marking the rows and covering corn, &c., which is constructed in accordance with my invention. Fig. 2 is a side elevation of the same. Fig. 3 is a sectional plan view of the device for covering the seed.

To put my invention into practice I provide a frame 1 of a suitable size and form of construction, and mount the same upon wheels (not shown) for the purpose of supporting the said frame above the ground. Attached to the forward end of this frame 1 is a series of vertically arranged bars 2, each of which is adjustably attached in position by means of two plates 3, and four bolts 4, in a manner that the same may be elevated or lowered to enter the blades into the ground to a certain depth. Attached to each of these bars 2 are blades 5, arranged in the form of a triangle having the apex toward the front, and are adapted to enter the ground and force the same to either side to form a furrow. These blades consist of two plates 5 rectangular in form, and bolted fast to the vertical bar 2 which is provided with beveled sides to correspond with the taper of the plates when in position.

To cover the furrow it is only necessary to reverse the bar 2 and plates as shown at Fig. 1 at the left, which will present the opening of the said plates to gather the soil toward the center, and if the rear edges of the plate are left open the same will have an opportunity to escape to prevent clogging of the parts.

By arranging two or more of these devices with the points forward in a group the same will form a cultivator. By arranging two of the devices the one a short distance below the other, and a suitable distance apart, a furrowing and marking apparatus is obtained, by means of which the furrow is formed in which the corn or other seed is planted, and at the same time the location of the next is marked out, and by arranging three of the devices at suitable distances apart upon the frame 1, a furrow may be formed, another covered and another marked out.

Having thus described my invention, what I claim, and desire to secure by Letters Patent, is—

The herein described apparatus for the purpose set forth, consisting of the frame 1, the vertical bars 2, and means for adjustably attaching the same to the said frame, the plates 5, attached to the bars 2 by means of bolts, and arranged to form a furrow, to cover, and to mark the same, substantially as and for the purpose described.

In testimony that I claim the foregoing I hereunto affix my signature this 17th day of October, A. D. 1892.

STEPHAN EMICK. [L. S.]

In presence of—
ALBERT J. WALKER,
M. E. HARRISON.